United States Patent [19]

Baumgartner

[11] Patent Number: 5,645,104

[45] Date of Patent: Jul. 8, 1997

[54] LINE EVACUATION DEVICE

[76] Inventor: A. C. Baumgartner, 503 W. Sundance Way, Chandler, Ariz. 85224

[21] Appl. No.: 726,951

[22] Filed: Oct. 7, 1996

[51] Int. Cl.⁶ .............................. F16L 41/06; B21D 28/28
[52] U.S. Cl. .................... 137/318; 30/92.5; 62/292
[58] Field of Search ....................... 137/15, 318; 30/90.4, 30/90.8, 92.5, 95, 96; 83/54, 745; 222/5, 83, 83.5, 89, 91; 62/77, 292

[56] References Cited

U.S. PATENT DOCUMENTS

| 1,782,020 | 11/1930 | Allen et al. | 222/5 |
|---|---|---|---|
| 2,017,365 | 10/1935 | Klein | 137/318 |
| 2,347,010 | 4/1944 | Ward | 222/5 |
| 2,875,777 | 3/1959 | Lacart | 137/318 |
| 3,248,010 | 4/1966 | DeBoer | 222/5 |
| 3,326,231 | 6/1967 | Hogg | 137/318 |
| 3,395,724 | 8/1968 | Hamel | 137/318 |
| 3,428,075 | 2/1969 | Wagner | 137/318 |
| 3,459,331 | 8/1969 | Hogg | 222/5 |
| 3,548,861 | 12/1970 | Mullins | 137/318 |
| 3,698,419 | 10/1972 | Tura | 137/318 |
| 3,811,461 | 5/1974 | Novak | 137/318 |
| 3,938,704 | 2/1976 | Milgram | 222/5 |
| 4,018,246 | 4/1977 | Langstroth | 137/318 |
| 4,216,793 | 8/1980 | Volgstadt | 137/318 |
| 4,955,406 | 9/1990 | Antoniello | 137/318 |
| 5,025,633 | 6/1991 | Furmanek | 62/292 |
| 5,291,914 | 3/1994 | Bares et al. | 137/318 |
| 5,301,532 | 4/1994 | Bickmore et al. | 137/318 |
| 5,322,083 | 6/1994 | Olivier | 137/318 |
| 5,349,979 | 9/1994 | Zeien et al. | 137/318 |
| 5,398,718 | 3/1995 | Roinick, Sr. | 137/318 |

Primary Examiner—George L. Walton
Attorney, Agent, or Firm—LaValle D. Ptak

[57] ABSTRACT

A device for use in evacuating fluid from a tubular refrigerant line comprises an elongated hollow tubular frame, which has a line seating extension attached to an open end of the frame and spaced from the end for engaging a refrigerant line in a position centered at right angles to the central axis of the elongated tubular frame. A reciprocating hollow inner tube is mounted for movement within the hollow frame and it has a piercing point on one end for movement into and out of engagement with a refrigerant line seated in the line seating extension. A resilient seal surrounds the piercing point for movement with it; and a cam mounted on the frame is used to move the inner tube to cause the piercing point to engage and pierce a refrigerant line located in the line seating extension.

20 Claims, 2 Drawing Sheets

LINE EVACUATION DEVICE

BACKGROUND

Chlorofluorocarbons (Freon or CFC's) have been recognized in recent years as a significant environmental problem. CFC's have been found to cause significant reductions in the stratospheric ozone layer, which functions to screen out significant amounts of the sun's deadly ultraviolet radiation. As the ozone layer is depleted, this screening is reduced and the ultraviolet radiation, which passes through the reduced layer, causes increased incidences of non-melanoma and melanoma skin cancer. In addition, CFC's also contribute to the greenhouse effect, since they are significantly more heat-absorbent than carbon dioxide. Other serious problems to the environment result from the release of CFC's into the atmosphere.

As a result of the scientific evidence linking the presence of CFC's in the atmosphere to the depletion of the ozone layer, laws (both federal and local) and regulations have been enacted which prescribe the conditions under which CFC coolants, which have been commonly used in freezers, refrigerators and automobile air conditioning systems, may be evacuated and discarded. In fact, in the United States and in other environmentally conscious countries, the production and use of CFC's is being phased out and prohibited. In the United States, there is a prohibition against venting withdrawn CFC coolants to the atmosphere, or against burying discarded cooling units in landfills without first removing the coolants contained in the units.

Various devices have been developed for facilitating the removal of CFC coolants from the refrigeration lines of air conditioners, refrigerators, freezers and the like by means of different types of piercing valves coupled through an evacuation line to a recovery vessel or bottle. It is important, from a standpoint of efficiency, to effect the removal of refrigerant fluids from the closed circuit lines of the assembled units in as short a time as possible. Typically, this is accomplished by piercing the refrigerant line on the unit from which coolant is to be recovered by means of a piercing valve, which then is connected to an approved storage vessel. The time required to secure such a piercing valve to the refrigerant line, to operate the valve, and then to subsequently remove the valve, can be significant. This substantially increases the cost of recovering the fluid from the discarded refrigeration unit.

Frequently, the removal of coolant from a discarded refrigeration device is accomplished by using a small saddle clamp with a piercing point and a coolant recovery line on it. The use of such devices require a high degree of manual dexterity. Several such clamps, involving various degrees of complexity in the manner in which they are sealingly secured to the refrigerant line and then subsequently operated, are disclosed in the U.S. Pats. to Lacart No. 2,875,777; Hogg No. 3,326,231; Wagner No. 3,428,075; Hogg No. 3,459,731; Langstroth No. 4,018,246 and Furmanek No. 5,025,633. While the piercing valve assemblies of these patents all differ in various constructional aspects, all of them involve a relatively large number of parts, and require considerable time and effort to install and use them.

An approach to significantly reduce the time required for the installation and removal of the piercing valve in order more efficiently to remove coolant from an existing refrigeration unit cooling line is disclosed in the U.S. Pats. to Hamel No. 3,395,724 and Tura No. 3,698,419. In both of these patents, a locking pliers is adapted to include a cradle on one of the jaws for receiving the refrigeration line which is to be purged. The other jaw carries a piercing needle and a resilient seal. The piercing needle is coupled to an evacuation hose; so that when the pliers are clamped onto a pipe, the piercing needle penetrates the pipe to permit evacuation of the pressurized fluid in the refrigeration or air conditioning system which is being evacuated. In both of these patents, a VICEGRIP type of pliers is employed.

A significant disadvantage of the piercing tools of both of these patents is that, in addition to the large number of parts required (including but not limited to all Of the parts commonly associated with VICEGRIP pliers), a substantial amount of space is required in two orthogonal directions to operate the tool. The pliers' handles must extend outwardly from the line or pipe which is to be pierced; so that they may be gripped and closed by the operator seeking to remove refrigerant from the line. The upper jaw in the devices of both of these patents then carries a piercing valve mechanism; and this mechanism extends upwardly from the jaw, which requires clearance in a direction perpendicular to the main direction of the handles of the pliers. Frequently, in refrigeration devices, especially refrigerators and freezers, the refrigerant lines are closely spaced together in loops or coils, which make access in this perpendicular or orthogonal direction difficult. As a consequence, while the devices of Hamel and Tura may appear to be easy to use and to facilitate refrigerant removal, they are instead difficult to use in close quarters. In fact, the tools of both of these patents are quite cumbersome to handle and operate.

It is desirable to provide a line evacuating device which overcomes the disadvantages of the prior art noted above, and which is inexpensive, simple in construction and use, and effective for the efficient removal of coolant from discarded refrigeration units.

SUMMARY OF THE INVENTION

It is an object of this invention to provide an improved line tapping device.

It is another object of this invention to provide an improved line evacuation device.

It is an additional object of this invention to provide an improved, easy-to-use line tapping and evacuation tool.

It is a further object of this invention to provide an improved, easy-to-use, cam operated line tapping and evacuation tool.

In accordance with a preferred embodiment of the invention, a device particularly useful for evacuating fluid from a tubular line comprises an elongated hollow tubular frame. This frame carries a line seating extension attached to a first end, with a portion spaced from the first end for engaging and centering the line at right angles to the central axis of the elongated tubular frame. An inner hollow tube is located for reciprocal movement within the tubular frame; and this hollow tube carries a piercing point located to project from the first end of the hollow tubular frame in at least a first position of the inner tube. A seal of resilient material surrounds the piercing point and a cam attached to the tubular frame is used to move the inner tube between a first position, where the piercing point pierces the wall of a line located in the line seating extension. In this position, fluid in the line flows from the line into the hollow inner tube and from there the fluid may be supplied to a recovery vessel. Movement of the cam releases the piercing point from the refrigeration line and the tool readily may be disengaged and removed from the line.

DETAILED DESCRIPTION

Figure 1:
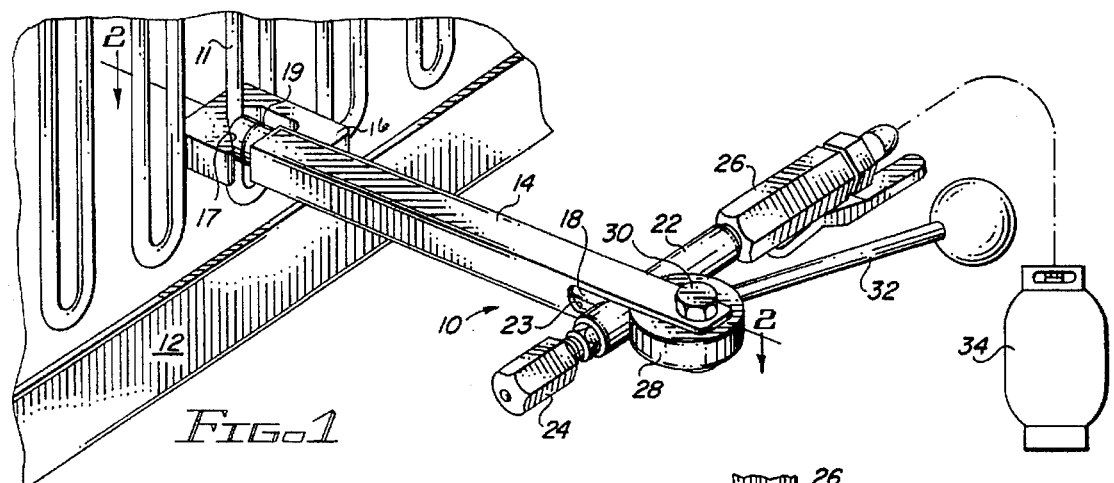
FIG. 1 is a perspective view of a preferred embodiment of the invention illustrating its manner of use.

Reference now should be made to the drawings, in which the same reference numbers are used throughout the different FIGS. to designate the same components. FIG. 1 is a perspective view of a preferred embodiment of the invention illustrating a tool 10, which is particularly suited for evacuating refrigerant fluid from a refrigerant line 11 typically found at the back of a refrigerator or freezer 12.

As illustrated in FIG. 1, the tool 10 is used in conjunction with a recovery vessel 34 which is connected to the tube through a flexible hose to collect fluids such as chlorofluorocarbons (CFC's) withdrawn from the tubular refrigerant line 11 by the tool 10. Frequently, the recovery vessel 34 is associated with an evacuation pump for assisting in evacuation of the line 11 and may also include suitable filters (not shown) for removing contaminants from the fluid supplied to the recovery vessel 34.

As illustrated in the various FIGS. of the drawings, the tool 10 includes an elongated hollow tubular frame 14 of a rectangular cross section (typically ⅝" square), with the other components of the tool mounted in and on the frame 14. Although the frame 14 is illustrated as having a rectangular cross section, other cross-sectional configurations, such as circular, may be employed. The frame 14 generally is made of metal such as steel or aluminum; but other suitable rigid materials, such as high impact plastic, also may be used.

As illustrated most clearly in FIGS. 2 and 3A through 3C, an elongated hollow inner tube 18 is located for reciprocal movement between first and second positions within the tube 14. The extent of movement of the tube 18 within the frame 14 is determined by three components. The right-hand end of the hollow inner tube 18 is attached at right angles to form a "T" with a short length of a hollow recovery tube 22. The recovery tube 22 extends outwardly through slots 23 in the outer hollow tubular frame 14. As illustrated most clearly in FIGS. 2 and 3, the inner tube 18 opens into the interior of the hollow recovery tube 22. The T-shaped configuration (shown most clearly in FIG. 6) formed by this construction is employed to limit the reciprocal movement of the tube 18 within the tubular frame 14 between the forward edge or left-hand edge of the slot 23 and the outer surface of an eccentrically mounted circular cam 28. This is illustrated most clearly in FIGS. 2 and 3A through 3C.

The open left-hand end of the inner hollow tube 18 (as viewed in FIGS. 1, 2, 3A to 3C and 6) is internally threaded to receive an externally threaded hollow needle insert 21, which terminates in a hollow piercing needle 20. The details of this insert are shown most clearly in FIG. 5; and the manner in which the insert 20/21 is located in the open left-hand end of the inner hollow tube 18 is clearly shown in FIGS. 2, 3A to 3B and 6. Again it should be noted that although the inner hollow tube or thrust tube 18 is shown in a circular cross-sectional configuration, other cross-sectional configurations may be used, so long as these configurations are compatible with the internal cross-sectional configuration of the outer hollow frame 14. As illustrated, the outer diameter of the inner thrust tube 18 is selected to closely approximate the smallest inside dimension of the frame 14; so that the tube 18 freely slides within the frame 18 with a minimum of play.

Figure 3A:
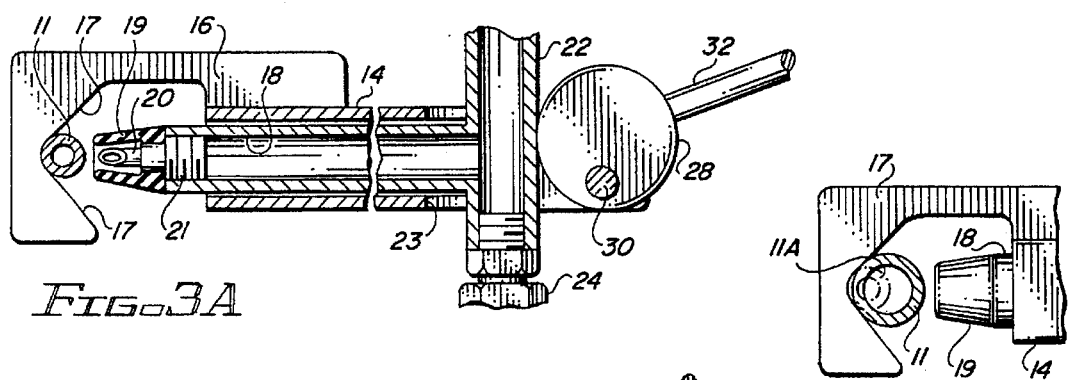
FIGS. 3A, 3B and 3C are cross-sectional side views illustrating different operating positions of the tool shown in FIG. 1.
Figure 4:
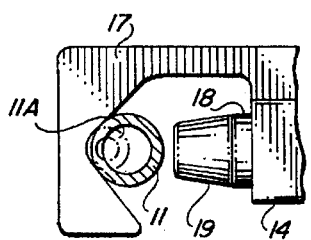
FIG. 4 is a detail of the portion of the tool shown in FIGS. 2 and 3.

A line seating extension 16 is secured to the open left-hand end (as viewed in FIGS. 1, 2, 3, 4 and 6) of the tubular frame 14 and extends beyond the end of the frame 14 and terminates in a hook or line seating portion 17, as shown most clearly in FIGS. 2, 3, 4 and 6. A generally V-shaped notch 17 is formed on the interior of the face of the extension 16, with the notch shaped to accommodate a refrigerant line 11 at right angles to the central axis of the reciprocating inner tube 18. It should be noted that other configurations of the notch or recession, other than the V-shaped notch 17, may be used, such as round, oval or various semi-circular configurations which may be employed to accommodate lines of different sizes. FIG. 4 illustrates the manner in which the V-shaped notch 17, however, is capable of accommodating refrigerant lines 11 and 11A of substantially different diameters. Since most refrigerant lines 11 of the type commonly employed in refrigerators, freezers and the like are constructed within a relatively narrow range of sizes, a fixed line seating extension 16 may be employed to accommodate these lines of different diameters. The extension 16, however, also can be removably attached to the frame 14 and made in different sizes to adapt the tool 10 for use with a wide range of diameters of lines 11.

Figure 5:
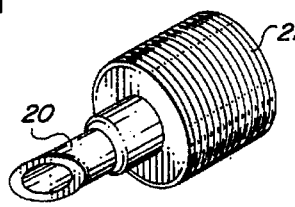
FIG. 5 is a perspective view of a portion of the tool shown in FIGS. 2 and 3.

A resilient elastomeric rubber or neoprene sleeve 19 is securely attached in fluid-tight relationship around the hollow piercing point 20 on a raised shoulder which abuts the threaded portion 21 of the point, as shown most clearly in FIG. 5. This resilient sleeve 19 is sufficiently flexible to make a fluid-tight sealing contact with the refrigerant line 11 when the piercing point 20 is moved toward the left (as viewed in FIGS. 2 through 3C). The cylindrical sealing member 19 is selected to have sufficient resiliency to conform to the outer shape of the refrigerant line 11, as illustrated in FIGS. 3B and 3C; so that a fluid-tight seal is effected when the piercing point 20 is moved to penetrate through the wall of the refrigerant line 11.

Figure 2:
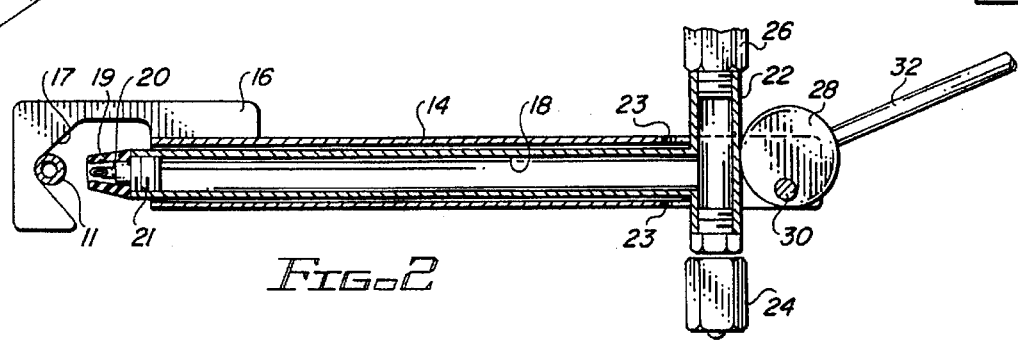
FIG. 2 is a cross-sectional side view of the tool shown in FIG. 1.
Figure 3B:
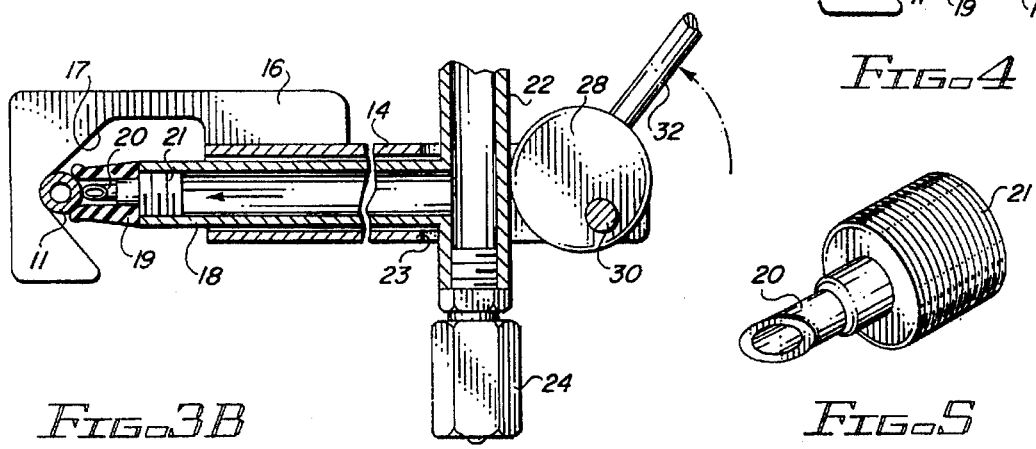
Figure 3C:
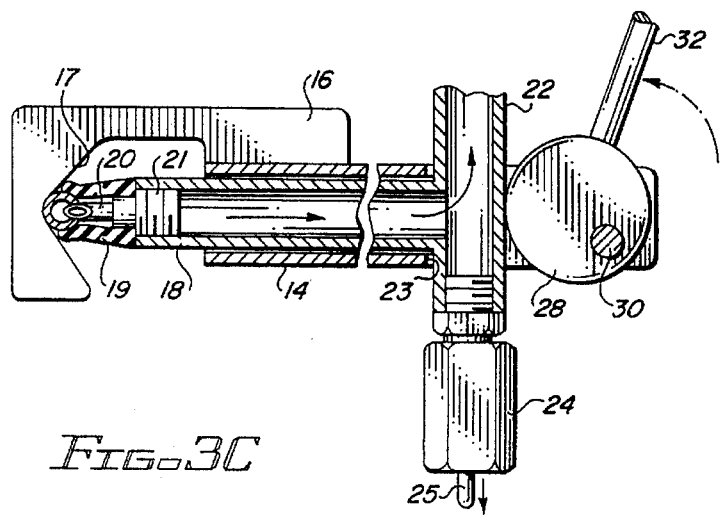

Reference now should be made to the sequential illustrations of FIGS. 3A to 3C for an understanding of the manner in which the device is operated to effect penetration and removal of fluid from a refrigerant line 11. As shown in FIGS. 2 and 3A, the line seating extension 16 is first placed around a refrigerant line 11, as shown most clearly in FIG. 1, to seat the line in a position which is at right angles to the direction of movement of the reciprocating inner tube 18. With the device in the position shown in FIG. 2, a handle 32, which is attached to the eccentrically mounted circular cam 28, is extended toward the right, as shown in FIG. 2. As noted in FIG. 2, the circular cam 28 is mounted on a pivot 30 secured to the bifurcated right-hand end of the frame 14. In this position, the recovery tube 22 may be pulled to the right (as shown in FIG. 2) against the surface of the cam 28; so that the resilient seal 19 and the hollow penetrating point 20 are spaced away from the line 11. This permits rapid seating of the line 11 in the V-shaped groove 17 of the line seating extension 16.

Once the parts are in the position shown in FIGS. 2 and 3A, the handle 32 attached to the cam 28 is rotated counterclockwise (as viewed in FIGS. 3A through 3C) to the position shown in FIG. 3B where the resilient seal 19 engages the outer surface of the refrigerant line 11. This establishes a fluid-tight sealing relationship with the line 11 prior to any penetration of the line by the hollow piercing point 20. Continued rotation of the handle 32 in a counter-clockwise direction to the position shown in FIG. 3C causes the penetrating point 20 to fully penetrate the wall of the refrigerant line 11; so that there is full fluid communication between any refrigerant in the line 11 and the penetrating point 20. Again as shown in FIG. 3C, the resilient elastomeric cylindrical 19 fully surrounds this penetration position to provide a fluid-tight seal. The hollow penetrating point 19 communicates with the hollow interior of the reciprocating inner tube 18 and the interior of the recovery tube 22 mounted at right angles to the tube 18 at the right-hand or opposite end, as shown in FIGS. 3A through 3C.

It should be noted that when the lever 32 is fully rotated to the position providing the maximum left-hand or leftward movement of the tube 18 to cause the piercing point 20 extend to its greatest distance beyond the open end of the frame 14, the piercing point 20 is prevented from extending toward the left (as viewed in FIG. 3C) to a distance greater than the center line of the smallest diameter refrigerant line 11 which is to be evacuated with the tool 10. This prevents undesirable penetration through the opposite side of any refrigerant line 11 which is to be evacuated by use of the tool.

Other features of the tool include the employment of an optional pressure gauge 24 or 25 (FIG. 6) to provide an indication of the pressure of the fluid refrigerant being evacuated by use of the tool 10. The pressure gauge 24 employs a pop-up end to provide an indicia any time the pressure within the tubes 18 and 22 exceeds atmospheric pressure in the ambient air around the tool. In the alternative, a direct reading analog pressure gauge 25 may be employed to provide a continuous reading of actual pressure variations which exist. The pressure gauges 24 or 25 are helpful for an operator to determine when full evacuation of the refrigerant line 11 has taken place; but these pressure gauges are not essential. If no pressure gauge is used, the lower or left-hand end of the recovery tube 22 to which these gauges are attached may be closed with a suitable cap (not shown).

Figure 6:
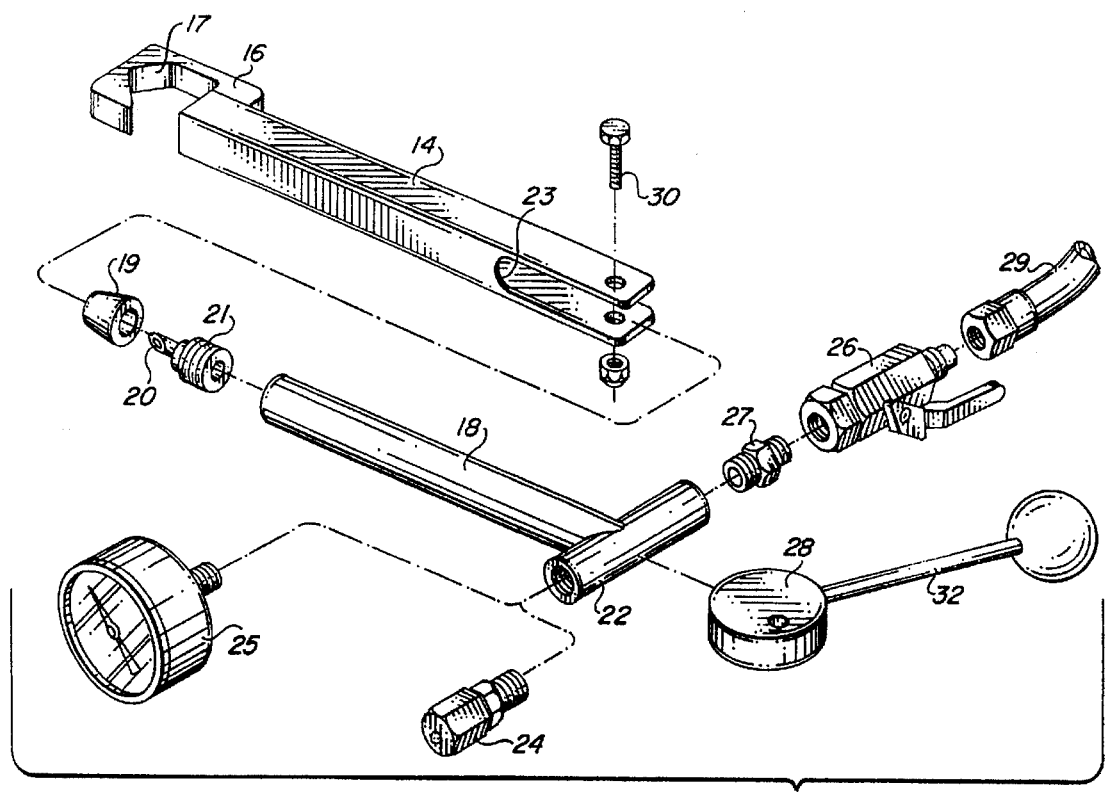
FIG. 6 is an exploded view of a tool according to a preferred embodiment of the invention.

The other end of the recovery tube 22 has a valve 26 which is secured to the recovery tube 22 either directly or through a coupler 27 (as shown in FIG. 6). This valve is fitted with a threaded extension for attachment to an evacuation hose 29, which in turn is connected to the recovery vessel 34 shown in FIG. 1. The valve 26 includes a handle which normally is maintained in a closed position, but which may be opened to withdraw coolant fluid from the refrigerant line 11 after the piercing point 20 has penetrated through the wall of the refrigerant line 11, as shown in FIG. 3C.

Following evacuation of refrigerant fluid from the line 11, the valve 26 is closed; and a reversal of the steps shown in FIGS. 3A through 3C is effected. When the cam 28 is rotated to the position shown in FIG. 2 and 3A, the recovery tube 22 (and therefore the connected reciprocating inner tube 18) may be pulled to the right (shown in FIGS. 2 and 3A) against the cam 28. This leaves a space between the line 11 and the end of the resilient elastomeric seal 19; so that the tool 10 readily may be removed from the line 11 for another use. It should be noted that because of the elongated linear design of the tool, it may be used with refrigeration lines 11 having close spacing, as illustrated in FIG. 1. The tool may be inserted between the coils of a refrigeration line and the spacing between adjacent turns of a serpentine refrigeration line need only be slightly greater than the vertical height (as seen in FIG. 2) of the end of the line seating extension 16.

Typically, this height is ¾" for the tool under consideration. There is no movement in any direction perpendicular to the reciprocal movement of the inner hollow evacuation tube 18 which is required for the operation of the tool. Consequently, it may be used in close spaces and in hard to reach positions. Because no springs or similar parts are employed, the simple construction of the tool renders it easy to install and remove; and rapid evacuation of refrigerant lines 11 may be effected through use of the tool. Very little manual dexterity is required to operate this tool. In addition, the operating time for removal of coolant from a typical refrigeration line 11 is reduced from several minutes to a matter of only a few seconds.

As is readily apparent from the foregoing description, the tool is capable of reaching into confined areas of a cooling unit where fingers and hands will not fit. It should be noted that the tool is effective for use with a wide variety of refrigeration units, such as household refrigerators, household and commercial freezers, automotive air conditioners and the like.

The foregoing description of the preferred embodiment of the invention should be considered as illustrative and not as limiting. Various changes and modifications will occur to those skilled in the art for performing substantially the same function, in substantially the same way, to achieve substantially the same result, without departing from the true spirit and scope of the invention as defined in the appended claims.

What is claimed is:

1. A device for use in evacuating fluid from a tubular line including in combination:

an elongated hollow tubular frame having first and second ends and open at least at the first end thereof;

an inner hollow tube with first and second ends located within said elongated hollow tubular frame for reciprocal movement between first and second positions within said hollow tubular frame;

a piercing point carried on said first end of said inner tube located to project from said first end of said elongated hollow tubular frame in at least said first position of said inner tube;

a seating extension attached to said first end of said frame and having a portion spaced from said first end of said frame for engaging a tubular line in a position substantially centered at right angles to the reciprocating direction of movement of said piercing point carried on said first end of said inner tube;

a seal of resilient material surrounding said piercing point for movement therewith; and a cam member carried on said tubular frame for engaging and moving said inner tube between said first and second positions to cause said piercing point to pierce said line engaged by said seating extension in said first position of said inner tube, with said seal sealingly engaging said line and for allowing fluid to be evacuated through said piercing point and said inner hollow tube; said piercing point, and for releasing said piercing point and said inner tube for movement to said second position thereof away from said line for removal of said device line.

2. The combination according to claim 1 wherein said piercing point is a hollow piercing point communicating with the interior of said inner hollow tube.

3. The combination according to claim 2 further including a hollow fluid removal tube mounted at right angles on the second end of said inner tube, with said said second end of said inner tube opening into said hollow removal tube, wherein said cam member engages said removal tube for effecting movement of said removal tube along with said inner tube between said first and second positions of said inner tube.

4. The combination according to claim 3 wherein said second end of said elongated hollow tubular frame is bifurcated and said removal tube extends through said bifurcated end for reciprocal movement with said hollow inner tube, and wherein said cam member is mounted in said second end of said tubular frame for engagement with said removal tube to effect said reciprocal movement between said first and second positions of said hollow inner tube.

5. The combination according to claim 4 wherein said cam member is an eccentric rotatable cam member.

6. The combination according to claim 5 wherein said line seating extension is configured to center said line engaged thereby for engagement by said piercing point.

7. The combination according to claim 4 wherein said hollow removal tube has first and second ends and wherein said second end of said inner tube is attached to said removal tube at a point intermediate the first and second ends thereof, and further including a pressure gauge attached to the first end of said removal tube in sealed communication therewith for measuring the pressure of fluid therein.

8. The combination according to claim 7 further including a pressure gauge in sealed communication with the interior of one of said inner tube and said removal tube for measuring the pressure of fluid therein.

9. The combination according to claim 8 further including a shut-off valve attached to the second end of said removable tube for releasable attachment to a storage vessel.

10. The combination according to claim 1 wherein said cam member is mounted on said second end of said elongated tubular frame wherein said tubular frame is bifurcated to provide a slot therein between said cam member and a point intermediate the first and second ends of said tubular frame.

11. The combination according to claim 10 wherein said cam member is an eccentric rotatable cam member.

12. The combination according to claim 11 wherein said line seating extension is configured to center said line engaged thereby for engagement by said piercing point.

13. The combination according to claim 10 wherein said piercing point is a hollow piercing point communicating with the interior of said inner hollow tube.

14. The combination according to claim 13 further including a hollow fluid removal tube mounted at right angles on the second end of said inner tube, with said said second end of said inner tube opening into said hollow removal tube, wherein said cam member engages said removal tube for effecting movement of said removal tube along with said inner tube between said first and second positions of said inner tube.

15. The combination according to claim 14 further including a pressure gauge in sealed communication with the interior of one of said inner tube and said removal tube for measuring the pressure of fluid therein.

16. The combination according to claim 15 wherein said hollow removal tube has first and second ends and wherein said second end of said inner tube is attached to said removal tube at a point intermediate the first and second ends thereof, and further including a pressure gauge attached to the first end of said removal tube in sealed communication therewith for measuring the pressure of fluid therein.

17. The combination according to claim 16 further including a shut-off valve attached to the second end of said removable tube for releasable attachment to a storage vessel.

18. The combination according to claim 1 further including a hollow fluid removal tube mounted at right angles on the second end of said inner tube, with said said second end of said inner tube opening into said hollow removal tube, wherein said cam member engages said removal tube for effecting movement of said removal tube along with said inner tube between said first and second positions of said inner tube.

19. The combination according to claim 18 wherein said second end of said elongated hollow tubular frame is bifurcated and said removal tube extends through said bifurcated end for reciprocal movement with said hollow inner tube, and wherein said cam member is mounted in said second end of said tubular frame for engagement with said removal tube to effect said reciprocal movement between said first and second positions of said hollow inner tube.

20. The combination according to claim 19 wherein said hollow removal tube has first and second ends and wherein said second end of said inner tube is attached to said removal tube at a point intermediate the first and second ends thereof, and further including a pressure gauge attached to the first end of said removal tube in sealed communication therewith for measuring the pressure of fluid therein.

* * * * *